United States Patent [19]

Bruning

[11] 4,317,758
[45] Mar. 2, 1982

[54] VISCOSITY-STABILIZED AQUEOUS SOLUTIONS

[75] Inventor: Donald D. Bruning, Bartlesville, Okla.

[73] Assignee: Phillips Petroleum Company, Bartlesville, Okla.

[21] Appl. No.: 144,085

[22] Filed: Apr. 28, 1980

[51] Int. Cl.$^3$ .............................................. C08K 5/39
[52] U.S. Cl. ................................. 524/202; 524/191; 524/203; 524/215; 524/225; 524/381
[58] Field of Search ................. 260/29.6 Z, 45.9 NC, 260/45.95 N

[56] References Cited

U.S. PATENT DOCUMENTS

| | | | |
|---|---|---|---|
| 2,864,803 | 12/1958 | Jones | 260/29.6 Z |
| 3,065,193 | 11/1962 | Volk | 260/29.6 Z |
| 3,163,619 | 12/1964 | Sheats | 260/29.6 Z |
| 3,234,163 | 2/1966 | Schurz | 260/29.6 Z |
| 3,235,523 | 2/1966 | Schurz | 260/29.6 Z |
| 3,343,601 | 9/1967 | Pye | 166/42 |
| 3,747,676 | 7/1973 | Norton | 166/275 |
| 3,800,877 | 4/1974 | Knight | 166/305 R |
| 4,042,772 | 8/1977 | Ballweber | 526/220 |
| 4,103,742 | 8/1978 | Swanson | 166/282 |
| 4,124,073 | 11/1978 | Wier | 166/272 |

*Primary Examiner*—Paul R. Michl

[57] ABSTRACT

Selected sulfur-containing compounds function as solution viscosity stabilizers in aqueous compositions comprising acrylamide polymers containing a redox couple or components which can produce a redox couple in the presence of the solution. The aqueous compositions are useful in post-primary oil recovery involving the use of thickened fluids as mobility buffers and mobility control agents.

17 Claims, No Drawings

VISCOSITY-STABILIZED AQUEOUS SOLUTIONS

This invention relates to aqueous solutions exhibiting a relatively stable solution viscosity. In accordance with another aspect, this invention relates to solutions of acrylamide polymers exhibiting a relatively stable solution viscosity. In accordance with a further aspect, this invention relates to the use of viscosity stabilizers for aqueous solutions containing acrylamide polymers. In accordance with a further aspect, this invention relates to aqueous compositions of acrylamide polymers having improved stability to thermal and/or oxidative breakdown by the addition of a stabilizing amount of a viscosity stabilizer.

It has been observed that aqueous solutions containing acrylamide polymers exhibit a loss in solution viscosity and are less stable at elevated temperature. While the exact mechanism by which such degradation occurs is not known, it is believed to be prompted by one or more agents, such as oxygen and metal ions, capable of existing in two valence states such as, for example, iron and copper, and the like. Generally suspect are materials which are capable of forming or contributing to the formation of a redox system. Such agents can be contained in the polymer or water as impurities or deliberately incorporated therein for other purposes. The present invention is directed to the addition of a viscosity stabilizer to aqueous solutions containing acrylamide polymers in order to minimize the loss of solution viscosity during storage and/or usage at ambient conditions as well as at elevated temperature.

Accordingly, an object of this invention is to provide viscosity-stabilized aqueous solutions.

A further object of this invention is to provide viscosity stabilizers for aqueous solutions exhibiting a tendency to lose solution viscosity.

A further object of this invention is to provide a viscosity-stabilized aqueous solution for utilization in oil recovery processes.

A further object of this invention is to inhibit viscosity degradation of aqueous solutions of acrylamide polymers.

Other objects, aspects, and the several advantages of the invention will become apparent upon the study of this disclosure and the appended claims.

In accordance with the present invention, selected sulfur-containing compounds function as solution viscosity stabilizers in aqueous compositions comprising acrylamide polymers containing a redox couple.

In accordance with one embodiment of the instant invention, selected sulfur-containing compounds such as thiourea, 2-mercaptoethanol and sodium N,N-dimethyl dithiocarbamate (THIOSTOP$^R$) function as viscosity stabilizers in thickened aqueous systems comprising acrylamide-derived polymers and reducing agents such as iron pipe, connate water, ferrous iron, hydrosulfide, and hydrosulfite in the presence of an oxidizing agent such as ambient oxygen.

Thus, in accordance with the invention, water-soluble solid acrylamide polymers are stablized or at least have improved resistance to thermal and/or oxidative degradation by intimately and uniformly incorporating therein a small but effective quantity of at least one of the viscosity stabilizers set forth herein.

The instant viscosity-stabilized compositions are particularly applicable to the area of post-primary oil recovery involving the use of thickened fluids as mobility buffers and mobility control agents. It is highly desirable that the viscosities of said thickened fluids remain relatively constant over extended time periods since actual field operations frequently last for many months. A thickened fluid characterized by a relatively constant viscosity over an extended period of time and temperature range is referred to as a stable thickened fluid. Said fluids can be prepared by using the viscosity stabilizers or protective agents described in the present teaching.

The acrylamide-derived polymers suitable for use in the present inventive process are described in U.S. Pat. No. 4,103,742, Swanson, which is incorporated herein by reference. The term "acrylamide polymer" is employed in the present specification and claims and refers to the homopolymers of acrylamide and water-soluble copolymers of acrylamide with other suitable monoethylenic monomers copolymerizable therewith. These acrylamide polymers are water-soluble, vinyl-type polymers characterized by substantial linearity, i.e., having little or no crosslinking between polymer chains. Aqueous solutions of said polymers in the concentration range of 50–2000 ppm, preferably 100–1000ppm, are suitable for use in the present invention.

Viscosity stabilizers suitable for use in the present inventive process include the alkali metal salts of N,N-dimethyldithiocarbamic acid such as sodium N,N-dimethyldithiocarbamate. Other suitable dialkyldithiocarbamates can be described by formula (A)

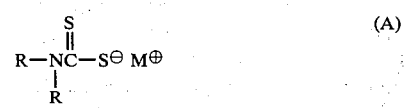

wherein R is an alkyl radical containing one to twelve carbon atoms and M represents alkali metal such as sodium and potassium.

Representative examples of suitable alkali metal salts that can be used include sodium N,N-dibutyldithiocarbamate; sodium N,N-diethyldithiocarbamate; sodium N,N-didodecyldithiocarbamate; sodium N,N-dihexyldithiocarbamate; sodium N,N-dimethyldithiocarbamate and the like, and mixtures thereof. Sodium N,N-dimethyldithiocarbamate is presently preferred.

Dithioacid salts suitable for use in the instant process are described by formula (B)

wherein R and M are as previously defined. Similarly constituted derivatives of thioacids described by formula (C) can also be used in the present process.

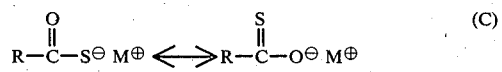

Representative examples of suitable dithioacid salts that can be used according to the invention include the alkali metal salts of dithioacetic acid, dithiobutyric acid, dithiodecanoic acid, dithiododecanoic acid and the like, and mixtures thereof.

Representative examples of suitable thioacid salts that can be used according to the invention include the alkali metal salts of thioacetic acid, thiohexanoic acid, thiododecanoic acid, thiobutyric acid, thiooctanoic acid and the like, and mixtures thereof.

In addition to thiourea, suitable viscosity stabilizers such as substituted thioureas are described by formula (D) wherein R' represents hydrogen, alkyl and aryl with the proviso that the total number of carbons in the R' groups does not exceed 24.

Representative examples of suitable thioureas that can be used according to the invention include thiourea; N,N,N',N'-tetramethyl thiourea; N,N'-dibutyl thiourea; N,N,N',N'-tetrahexyl thiourea; N,N,N'-triethyl thiourea; N,N-diphenyl-N',N'-dimethyl thiourea; N,N-diphenyl-N',N'-dihexyl thiourea and the like, and mixtures thereof. Thiourea is presently preferred.

Thiosemicarbazides suitable for use in the present process are described by formula (E) wherein

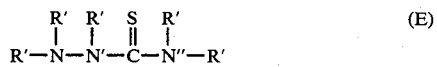

R' represents hydrogen, alkyl and aryl with the proviso that the total number of carbons in the R' groups does not exceed 24.

Representative examples of suitable thiosemicarbazides that can be used according to the invention include N,N,N'',N'''-tetramethyl thiosemicarbazide; N,N-diphenyl-N'',N'''-dibutyl thiosemicarbazide; N,N',N'',N'''-tetrabutyl thiosemicarbazide; N,N-diphenyl-N',N''-dihexyl thiosemicarbazide and the like, and mixtures thereof.

Thiocarboxamides suitable for use in the present invention are described by the formula (F) wherein

the R' groups and total number of carbon atoms are as described hereinabove in formulas (D) and (E).

Representative examples of suitable thiocarboxamides that can be used according to the invention include N,N-dimethyl thioacetamide; N,N-dibutyl thiobenzamide; N,N-dipentyl thiotetradecanamide; N,N-dihexyl thiopropionamide; N,N-dipropyl thiododecanamide; N,N-dimethyl thioformamide; N-methyl thiohexanamide, and the like, and mixtures thereof.

Mercaptoalkanols exemplified by 2-mercaptoethanol which are suitable for use as viscosity stabilizers in the present process are described by formula (G) wherein $$(HS)_a-R''-(OH)_b \quad (G)$$

R'' represents a polyvalent alkylene radical containing 2 to 20 carbon atoms and the subscripts a and b vary individually over the range of 1 to 3 with the proviso that the sum of a and b preferably does not exceed 4.

Representative examples of suitable mercaptoalkanols that can be used according to the invention include 2-mercaptoethanol, 2-mercaptopropanol, 2,11-dimercapto-1,12-dodecanediol; 2,10,19-trimercapto-1,11,20-eicosanetriol; 1,4-dimercapto-2,3-butanediol; 2-mercapto-1-octanol and the like, and mixtures thereof.

In carrying out the invention, the above-described viscosity stabilizers are incorporated into solutions of the acrylamide polymers in any convenient manner. One procedure involves addition of the stabilizing component and the acrylamide polymer separately to a common aqueous medium. If the polymer is dissolved first, it is desirable to utilize efficient mixing devices such as mixing mills, pumps suitably designed, or enclosed augers to accomplish a complete and uniform mixing of the additives throughout the polymer solution. In another procedure, a sufficient quantity of the additive is first uniformly blended with the acrylamide polymer to inhibit degradation of the polymer when dissolved and then utilizing the resulting composition to prepare stable aqueous solutions.

The following Example illustrates the effectiveness of thiourea as a protective agent or viscosity stabilizer in heated aqueous polyacrylamide solutions exposed to atmospheric oxygen and containing sodium hydrosulfite reducing agent.

EXAMPLE I

Aqueous polyacrylamide solution samples containing about 450 ppm polymer and the varying concentrations of thiourea shown in Table I were placed in individual glass flasks open to the atmosphere and the initial solution viscosity was measured and recorded in Table I. Sufficient sodium hydrosulfite reducing agent (a known oxygen scavenger) was added to the thickened polyacrylamide solutions to bring the concentration of $Na_2S_2O_4$ to 125 ppm and solution viscosity was again measured and recorded in Table I. All of the solutions were then heated for two hours open to the air at 150° F. (65° C.), cooled to ambient temperature, and solution viscosities were measured again. The results are summarized in Table I.

TABLE I

Thiourea-Stabilized Aqueous Polyacrylamide Solutions*

| | | | | Viscosity @ 75° F. (cp) | | |
|---|---|---|---|---|---|---|
| Run | Type of Run | ppm $Na_2S_2O_4$ | ppm Thiourea | Before $Na_2S_2O_4$ | After $Na_2S_2O_4$ | After Heating for 2 hrs. @ 150° F. |
| 1 | Control | 0 | 0 | 34.4 | NA# | 33.2, 32.7 |
| 2 | Control | 0 | 500 | 34.2 | NA# | 34.2 |
| 3 | Control | 125 | 0 | 34.4 | 29.3 | 3.8 |
| 4 | Invention | 125 | 50 | 34.4 | 28.6 | 23.8 |
| 5 | Invention | 125 | 100 | 34.3 | 28.7 | 27.1 |
| 6 | Invention | 125 | 150 | 32.9 | 28.4 | 27.9 |
| 7 | Invention | 125 | 200 | 32.7 | 28.4 | 28.4 |
| 8 | Invention | 125 | 500 | 32.5 | 28.4 | 30.4 |

TABLE I-continued

Thiourea-Stabilized Aqueous Polyacrylamide Solutions*

| Run | Type of Run | ppm Na$_2$S$_2$O$_4$ | ppm Thiourea | Viscosity @ 75° F. (cp) Before Na$_2$S$_2$O$_4$ | After Na$_2$S$_2$O$_4$ | After Heating for 2 hrs. @ 150° F. |
|---|---|---|---|---|---|---|
| 9 | Invention | 125 | 1000 | 32.8 | 28.4 | 29.8 |

*Solutions contained 450 ppm polyacrylamide.
NA represents not applicable.

By referring to Table I, it is evident that heating an aqueous polyacrylamide solution exposed to air to a temperature of 150° F. in the absence of a reducing agent resulted in essentially no loss in solution viscosity (see run 1). Control run 3 in Table I shows the dramatic decrease in viscosity of an aqueous polyacrylamide solution containing a reducing agent, hydrosulfite, which occurs on heating to 150° F. for two hours in contact with atmospheric oxygen. Control run 3 represents a possible condition encountered by polymer solutions used in oil recovery since chemical reducing agents are commonly used to scavenge dissolved oxygen and an oil reservoir is generally considered to be a reducing environment. Control run 2 demonstrates that solution viscosity remains constant on heating in the presence of thiourea and absence of hydrosulfite. Control run 4 shows that 50 ppm thiourea is insufficient stabilizer for the system comprising 125 ppm hydrosulfite. The remaining runs (5–8) in Table I are considered invention runs as it is demonstrated that the addition of 100 to 500 ppm thiourea to the hydrosulfite-containing solutions is sufficient to stabilize solution viscosity in the range of 27 to 30 cp after the heat treatment. A thiourea level of 1000 ppm (run 9) appears to be comparable to the results obtained with 500 ppm thiourea (run 8).

In regard to the concentration of thiourea which is suitable for use in the present invention, polymer solutions varying in concentration from 50 to 700 ppm are stabilized with thiourea over the broad range of 50 to 500 ppm, preferably 100 to 200 ppm thiourea. It is noted that larger amounts of thiourea can be used if desired with the only limits being due to economics and/or availability.

The following Example illustrates the effectiveness of 2-mercaptoethanol as a protective agent or viscosity stabilizer in heated aqueous polyacrylamide solutions exposed to atmospheric oxygen and containing hydrosulfite reducing agent.

EXAMPLE II

Aqueous polyacrylamide solutions comprising polyacrylamide, sodium hydrosulfite and water were examined as described in Example I. The results are summarized in Table II.

TABLE II

2-Mercaptoethanol-Stabilized Aqueous Polyacrylamide Solutions*

| Run | Type of Run | ppm Na$_2$S$_2$O$_4$ | ppm 2-Mercaptoethanol | Viscosity @ 75° F. (cp) Before Na$_2$S$_2$O$_4$ | After Na$_2$S$_2$O$_4$ | After Heating for 2 hrs. @ 150° F. |
|---|---|---|---|---|---|---|
| 10 | Control | 0 | 0 | 34.2 | NA# | 32.4 |
| 11 | Control | 125 | 0 | 34.5 | 28.7 | 3.6 |
| 12 | Invention | 125 | 25 | 32.9 | 27.3 | 23.8 |
| 13 | Invention | 125 | 50 | 32.4 | 26.1 | 26.6 |
| 14 | Invention | 125 | 100 | 31.8 | 27.4 | 26.9 |
| 15 | Invention | 125 | 200 | 31.8 | 26.8 | 23.9 |
| 16 | Invention | 125 | 500 | 31.4 | 26.5 | 19.8 |
| 17 | Invention | 125 | 1000 | 31.7 | 27.6 | 26.5 |

*Solutions contained about 450 ppm polyacrylamide.
NA represents not applicable.

Referring to Table II, invention runs 12–17 demonstrate that levels of 2-mercaptoethanol in the range of 25 to 1000 ppm stabilize solution viscosity. As observed in Example I, control runs 10 and 11 show, respectively, the viscosity stability of heated aqueous polyacrylamide solution without added reducing agent, and the dramatic loss of solution viscosity in a heated aqueous polyacrylamide system containing hydrosulfite reducing agent.

In regard to the concentration of 2-mercaptoethanol which is suitable for use in the present invention, polymer solutions varying in concentration from 50–2000 ppm, preferably 100–1000 ppm, are stabilized with 2-mercaptoethanol over the broad rand of 15–1000 ppm, preferably 25–200 ppm. Larger concentrations of 2-mercaptoethanol can be used, if desired, with the only limits being due to economics and/or availability.

The following Example illustrates the effectiveness of sodium N,N-dimethyldithiocarbamate (THIOSTOP ®) as a protective agent or viscosity stabilizer in heated aqueous polyacrylamide solutions exposed to atmospheric oxygen and containing sodium hydrosulfite reducing agent.

EXAMPLE III

Aqueous polyacrylamide solutions comprising polyacrylamide, sodium hydrosulfite and water were examined as described in Example I and the results are summarized in Table III.

TABLE III

Sodium Dimethyldithiocarbamate-Stabilized Aqueous Polyacrylamide Solutions*

| Run | Type of Run | ppm Na$_2$S$_2$O$_4$ | ppm sodium dimethyldithiocarbamate | Viscosity (cp) @ 75° F. Before Na$_2$S$_2$O$_4$ | After Na$_2$S$_2$O$_4$ | After Heating for 2 hrs. @ 150° F. |
|---|---|---|---|---|---|---|
| 18 | Control | 0 | 0 | 33.9 | NA# | 32.9 |

TABLE III-continued
Sodium Dimethyldithiocarbamate-Stabilized Aqueous Polyacrylamide Solutions*

| Run | Type of Run | ppm $Na_2S_2O_4$ | ppm sodium dimethyldithiocarbamate | Viscosity (cp) @ 75° F. | | |
|---|---|---|---|---|---|---|
| | | | | Before $Na_2S_2O_4$ | After $Na_2S_2O_4$ | After Heating for 2 hrs. @ 150° F. |
| 19 | Control | 125 | 0 | 33.5 | 28.8 | 3.2 |
| 20 | Invention | 125 | 25 | 32.4 | 26.3 | 27.3 |
| 21 | Invention | 125 | 50 | 32.4 | 25.9 | 26.5 |
| 22 | Invention | 125 | 100 | 32.0 | 25.7 | 28.2 |
| 23 | Invention | 125 | 200 | 30.4 | 25.7 | 28.2 |
| 24 | Invention | 125 | 500 | 27.8 | 24.8 | 25.2 |
| 25 | Invention | 125 | 1000 | 24.7 | 22.7 | 23.2 |

*Solutions contained about 450 ppm polyacrylamide.
NA represents not applicable.

In Table III, control run 18 shows the stability of the heated aqueous polyacrylamide solution in contact with air without added reducing agent. Control run 19 shows the dramatic loss of solution viscosity in the heated aqueous polyacrylamide mixture containing hydrosulfite reducing agent. Invention runs 20-23 demonstrate that levels of sodium dimethyldithiocarbamate in the range of 25 to 200 ppm stabilize solution viscosity. Levels of sodium dimethyldithiocarbamate in the range of 500 to 1000 ppm (see runs 24 and 25) appear ineffective in stabilizing solution viscosity.

In regard to the concentration of sodium N,N-dimethyldithiocarbamate which is suitable for use in the present invention, polymer solutions varying in concentration from 50°-2000 ppm, preferably 100-1000 ppm, are stabilized with sodium dimethyldithiocarbamate over the broad range of 25 to 1000 ppm, preferably 50 to 200 ppm.

The following Example demonstrates the greater efficiency of thiourea as a solution viscosity stabilizing agent compared to other known agents such as sodium nitrite (run 28), isopropanol (run 29), sodium thiocyanate (run 30), urea (run 31), and formaldehyde (run 32). The results are summarized in Table IV. These runs were carried out in essentially the same manner as those described in Example I.

EXAMPLE IV

The aqueous polyacrylamide solution contained about 500 ppm polymer, 100 ppm protective agent (viscosity stabilizer) and 100 ppm hydrosulfite reducing agent (oxygen scavenger). Brookfield viscosities (6 rpm) were taken before and after the heat treatment.

Invention run 33 shows the much greater efficiency of thiourea relative to the control runs 28-32 in stabilizing solution viscosity. A similar order of effectiveness was observed at the 500 ppm level of stabilizer agents. In addition, at the 500 ppm level, mercaptopropionic acid was found to be ineffective as a solution viscosity stabilizer.

TABLE IV
Survey of Viscosity Stabilizers for Aqueous Polyacrylamide Solutions

| Run | Type of Run | ppm $Na_2S_2O_4$ | ppm Stabilizer | Viscosity @ 75° F. (cp) | | |
|---|---|---|---|---|---|---|
| | | | | Before $Na_2S_2O_4$ | After $Na_2S_2O_4$ | After Heating for 2 hrs. @ 150° F. |
| 26 | Control | 0 | 0 | 38.8 | NA# | 36.5 |
| 27 | Control | 100 | 0 | 39.1 | 32.7 | 4.8 |
| 28 | Control[a] | 100 | 100 | 36.2 | 30.7 | 6.9 |
| 29 | Control[b] | 100 | 100 | 38.4 | 32.2 | 5.5 |
| 30 | Control[c] | 100 | 100 | 35.8 | 30.6 | 10.6 |
| 31 | Control[d] | 100 | 100 | 37.6 | 31.0 | 3.3 |
| 32 | Control[e] | 100 | 100 | 37.6 | 32.7 | 5.8 |
| 33 | Invention[f] | 100 | 100 | 37.5 | 32.7 | 30.2 |

NA represents not applicable
[a]Sodium nitrite stabilizer
[b]Isopropanol stabilizer
[c]Sodium thiocyanate stabilizer
[d]Urea stabilizer
[e]Formaldehyde stabilizer
[f]Thiourea stabilizer

I claim:
1. A composition of matter comprising an aqueous solution of an acrylamide polymer containing a redox couple or components which can produce a redox couple in the presence of the solution having dissolved therein a viscosity stabilizing amount of a sulfur-containing viscosity stabilizer compound selected from the group consisting of
(a) an alkali metal salt of N,N-dialkyldithiocarbamate acid, represented by the formula

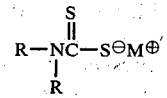

wherein R is an alkyl radical containing one to twelve carbon atoms and M represents alkali metal;
(b) dithioacid salts represented by the formula

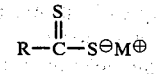

wherein R and M are as previously defined;
(c) thioacid salts represented by the formula

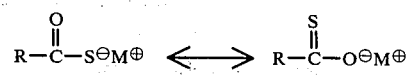

wherein R and M are as previous defined;
(d) thiosemicarbazides represented by the formula

wherein R' represents hydrogen, alkyl and aryl groups with the proviso that the total number of carbon atoms in the R' groups does not exceed 24;
(e) thiocarboxamides represented by the formula

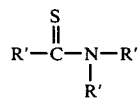

wherein R' is as previously defined; and
(f) mercaptoalkanols represented by the formula

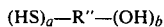

wherein R" represents a polyvalent alkylene radical containing 2 to 20 carbon atoms and the subscripts a and b vary individually over the range of 1 to 3 with the proviso that the sum of a and b does not exceed 4.

2. A composition according to claim 1 wherein the polymer concentration in said solution ranges from about 50 to about 2000 ppm and the amount of viscosity stabilizer ranges from about 15 to about 1000 ppm.

3. A composition according to claim 1 wherein the polymer concentration in said solution ranges from about 100 to about 1000 ppm and the amount of viscosity stabilizer ranges from about 25 to about 200 ppm.

4. A composition according to claim 1 wherein the viscosity stabilizer is a compound represented by formula (a).

5. A composition according to claim 4 wherein said compound is sodium N,N-dimethyldithiocarbamate.

6. A composition according to claim 1 wherein said stabilizing compound is a compound having the formula (e).

7. A composition according to claim 6 wherein said compound is 2-mercaptoethanol.

8. A composition according to claim 3 wherein said composition comprises polyacrylamide, sodium hydrosulfite, water, and sodium N,N-dimethyldithiocarbamate or 2-mercaptoethanol.

9. A composition of matter comprising an aqueous solution of an acrylamide polymer containing from about 50 to about 700 ppm acrylamide polymer and a redox couple or components which can produce a redox couple in the presence of the solution having dissolved therein a viscosity stabilizing amount ranging from about 100 to about 500 ppm based on total composition, of a sulfur-containing viscosity stabilizing compound having the formula

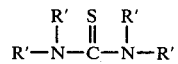

wherein R' represents hydrogen, alkyl and aryl groups with the proviso that the total number of carbon atoms in the R' groups does not exceed 24.

10. A composition according to claim 9 wherein said viscosity stabilizing compond is thiourea.

11. A composition according to claim 10 wherein based on total composition, the amount of stabilizing compound present ranges from about 100 to about 200 ppm.

12. A method of enhancing the stability of acrylamide polymers in aqueous solutions containing a redox couple or components which can produce a redox couple in the presence of the solution which comprises the step of incorporating into the solution a sufficient quantity of at least one of the compounds defined in claim 1 to inhibit degradation of the dissolved polymer.

13. A method according to claim 12 wherein the amount of stabilizer present ranges from about 15 to about 1000 ppm and the concentration of polymer ranges from about 50 to about 2000 ppm.

14. A method according to claim 12 wherein the amount of viscosity additive present ranges from about 25 to about 200 ppm and the additive is sodium N,N-dimethyldithiocarbamate or 2-mercaptoethanol.

15. In a method for improving the stability of an acrylamide polymer to thermally induced molecular weight breakdown in aqueous solutions containing from about 50 to about 700 ppm acrylamide polymer and a redox couple or components which can produce a redox couple in the presence of the solution the step of incorporating into the solution about 50 to about 500 ppm of a thiourea compound as defined in claim 9.

16. A method according to claim 15 wherein based on total composition, the amount of thiourea present ranges from about 100 to about 200 ppm.

17. A method according to claim 15 wherein thiourea is incorporated into said polymer solution.

* * * * *